(12) United States Patent
Starvik (10) Patent No.: US 8,761,164 B2
(45) Date of Patent: Jun. 24, 2014

(54) NETWORK OFFLOADING WITH REDUCED PACKET LOSS

(75) Inventor: Mikael Starvik, Loddekopinge (SE)

(73) Assignee: Axis AB, Lund (SE)

( * ) Notice: Subject to any disclaimer, the term of this patent is extended or adjusted under 35 U.S.C. 154(b) by 490 days.

(21) Appl. No.: 12/812,050

(22) PCT Filed: Oct. 29, 2008

(86) PCT No.: PCT/SE2008/051228
§ 371 (c)(1),
(2), (4) Date: Oct. 1, 2010

(87) PCT Pub. No.: WO2009/088341
PCT Pub. Date: Jul. 16, 2009

(65) Prior Publication Data
US 2011/0007740 A1 Jan. 13, 2011

Related U.S. Application Data

(60) Provisional application No. 61/025,115, filed on Jan. 31, 2008.

(30) Foreign Application Priority Data

Jan. 8, 2008 (EP) .................................... 08150092

(51) Int. Cl.
*H04L 12/28* (2006.01)
(52) U.S. Cl.
USPC ........................................... 370/389; 370/235
(58) Field of Classification Search
None
See application file for complete search history.

(56) References Cited

U.S. PATENT DOCUMENTS

| 6,996,070 B2 | 2/2006 | Starr et al. |
| 7,167,926 B1 | 1/2007 | Boucher et al. |

(Continued)

FOREIGN PATENT DOCUMENTS

| JP | 11-68787 A | 3/1999 |
| JP | 2006-333091 A | 12/2006 |

(Continued)

OTHER PUBLICATIONS

Japanese Office Action issued May 9, 2012 in Patent Application No. 2010-542194 with English Translation.

(Continued)

*Primary Examiner* — Robert Wilson
(74) *Attorney, Agent, or Firm* — Oblon, Spivak, McClelland, Maier & Neustadt, L.L.P.

(57) ABSTRACT

The invention relates to a method of transmitting a first segment of data via a data network from a transmitting unit having a first data transmission rate to a first destination having a first data reception rate. Where the first data transmission rate is larger than the first data reception rate, the method comprising: effectively reducing the first transmission rate from the transmitting unit to the first destination by switching between transmitting at least a part of the first segment as one or more data packets to the first destination in a direction only from the transmitting unit to the first destination, and transmitting at least a part of second segment as one or more data packets to one or more additional destinations in a direction only from the transmitting unit to the one or more additional destinations, the switching being repeated until said first segment and/or at least said second segment has been transmitted. In this way, the packet rate to a client is reduced while the total packet rate for the transmitting system is maintained whereby a decreased probability of packet loss and/or of router buffer exhaustion is achieved since data to relatively slower client will not be transmitted at full rate.

19 Claims, 7 Drawing Sheets

(56) References Cited

U.S. PATENT DOCUMENTS

| | | | |
|---|---|---|---|
| 7,174,393 B2 | 2/2007 | Boucher et al. | |
| 7,224,671 B2 * | 5/2007 | Lee et al. | 370/235 |
| 2004/0095883 A1 | 5/2004 | Chu et al. | |
| 2004/0153951 A1 | 8/2004 | Walker et al. | |
| 2004/0210684 A1 | 10/2004 | Granig et al. | |
| 2006/0034176 A1 | 2/2006 | Lindsay | |
| 2011/0007740 A1 * | 1/2011 | Starvik | 370/389 |

FOREIGN PATENT DOCUMENTS

| | | |
|---|---|---|
| JP | 2006-345173 A | 12/2006 |
| WO | 02 45372 | 6/2002 |

OTHER PUBLICATIONS

Y. Sakakibara, "Nikkei System Integration 2005", Nikkei Business Publications, Inc., No. 141, Dec. 26, 2004, pp. 110-113.

Willmann P. et al., "An Efficient Programmable 10 Gigabit Ethernet Network Interface Card", IEEE Computer Society, pp. 96-107, (Feb. 12, 2005).

Huang, Wei et al., "High Performance Virtual Machine Migration with RDMA over Modern Interconnects", Cluster Computing, 2007 IEEE International, pp. 11-20, (Sep. 17, 2007).

* cited by examiner

Before transmission starts

Fig. 2a

During transmission

Fig. 2b

Transmission finished

Fig.10

NETWORK OFFLOADING WITH REDUCED PACKET LOSS

FIELD OF THE INVENTION

The present invention generally relates to network offloading.

More specifically, the present invention relates to a method of transmitting a first segment of data via a data network from a transmitting unit to a first destination and a device for transmitting a first segment of data via a data network from a transmitting unit to a first destination.

Furthermore, the invention relates to a computer readable medium having stored thereon instructions for causing one or more processing units to execute the method according to the invention.

BACKGROUND OF THE INVENTION

When a network enabled device transmits a relatively large chunk of data (hereinafter referred to as a segment), e.g. a JPEG picture or any other kind of data, over a network, the segment is typically split into several data packets by a network enabled device before it is transmitted on the physical medium. As one example, the maximum payload size in an Ethernet packet is 1500 bytes. Additionally, protocol headers, such as TCP and IP headers, must be generated for each data packet and for some protocol stacks (such as TCP/IP) one or several checksums must also be calculated for each data packet where the one or more checksums are stored in a header of the data packet.

Normally, a chunk of data or segment is larger than the size of the payload (in principle the segment size may e.g. be as little as a single byte). Often it is several times the size of the payload.

The process of generating these packets including headers and checksums is traditionally done in software. This may use a substantial amount of CPU performance depending on the CPU performance and network speed of the system.

Various solutions addressing this have been proposed by implementing features in hardware. Such processes are also often referred to as (hardware) network offloading.

There are several available hardware solutions to perform network offloading. One traditional method of doing network offloading in hardware can be summarized as:
  Read one MTU (Maximum Transmission Unit, i.e. the maximum payload size of one packet on the used network medium) of data from a memory.
  Calculate a checksum over the payload while reading from memory.
  Generate headers.
  Transmit a packet comprising the headers and payload.
  While transmitting, read one additional MTU of data from the memory.
  Repeat until all packets in the segment, i.e. the chunk of data, have been transmitted.

A drawback of this solution is that it may send many packets at a very fast rate, which may cause problems for relatively slower connected receiving clients. As an example, consider a device connected to a relatively fast network (e.g. a 1 gigabit/second network) that wants to transmit a large segment to a client connected to a relatively slower network (e.g. a 10 megabit/second network). In this case, routers in the transmission path between the device and the client have to buffer the data until the client has read it all. This may result in buffer exhaustion in the routers. Furthermore, as the routers have a limited buffer size and may also need to buffer data for other transmissions paths, this may lead to data packets being dropped and thereby requiring retransmission. The probability of a packet drop increases with larger segment sizes.

One previously known solution to this problem, typically implemented in software, involves sending only a limited number of packets to each destination and wait for acknowledgement (ACK) before sending additional data packets. However, this increases the CPU usage and may also delay the overall time needed for transmitting the data due to the waiting.

For example, US 2006/034176 describes a hardware implementation using ACK's. A drawback of this is that only protocols such as TCP/IP, which relies on the use of ACK's, can be supported.

Thus there is a need for addressing the problems of router buffer exhaustion and data packets being dropped.

This has been addressed at least to some extent by interleaving packets to different destinations but where packets are interleaved by the same or a similar rate.

U.S. Pat. No. 7,174,393 discloses a communication-processing device (CPD) for data communication that provides a fast-path that avoids protocol processing for most large multipacket messages and slow-path messaging. A network processor chooses between processing messages along the slow-path that includes a protocol stack of a host or along the fast-path that bypasses the protocol stack of the host.

U.S. Pat. No. 7,167,926 discloses a device working with a host computer for data communication providing a fast-path that avoids protocol processing for most messages, accelerating data transfer and offloading time-intensive processing tasks from the host CPU. The host has a processing capability for validating selected message for either fast-path or slow-path processing.

U.S. Pat. No. 6,996,070 discloses a TCP Offload Engine (TOE) device including a state machine that performs TCP/IP protocol processing operations in parallel. In three different aspects it; stores TCP variables and header values, updates of multiple TCP state variables, and set up a DMA move.

OBJECT AND SUMMARY OF THE INVENTION

It is an object of the invention to provide a method (and corresponding device) that avoids or minimizes router buffer exhaustion and/or drop of data packets.

A further object is to decrease the CPU usage for a segmentation process.

This is achieved by a method of transmitting a first segment of data via a data network from a transmitting unit to a first destination, the transmitting unit having a first data transmission rate, the first destination having a first data reception rate, where the first data transmission rate is larger than the first data reception rate, the method comprising: effectively reducing the first transmission rate from the transmitting unit to the first destination by switching between transmitting at least a part of said first segment as one or more data packets to the first destination, the transmission being in a direction only from the transmitting unit to the first destination, and transmitting at least a part of at least a second segment as one or more data packets to one or more additional destinations, the transmission being in a direction only from transmitting unit to one or more additional destinations, said switching being repeated until said first segment and/or at least said second segment has been transmitted.

One or more wait states can be inserted between the data packets of said at least first segment being transmitted to the first destination.

In this way, the packet rate to a client or destination is reduced while the total packet rate for the transmitting system is maintained whereby a decreased probability of packet loss and/or of router buffer exhaustion is achieved since data to relatively slower client will not be transmitted at full rate. This is achieved while substantially maintaining the overall transmission rate.

Additionally, all destinations—when sending to multiple destinations—obtain data early, as transmission to other clients does not wait until a given segment for a previous client has been transmitted completely. The clients can in this way start processing the received data earlier.

An advantage of such a method is that it enables support for arbitrary protocols. That is, it supports protocols that use ACK's as well as protocols that do not use ACK's. For example, support for RTP over UDP is provided, which is an advantage compared to the ACK-based communication that is described in the above mentioned US 2006/034176.

In one embodiment, the method further comprises, before switching is to be done, saving a first position in said first segment defining how much of said first segment has been transmitted and/or saving a position of said second segment defining how much of said second segment has been transmitted and when transmission of said first segment or said second segment is switched back to again, resuming transmission from the respective saved position.

In one embodiment, switching is done according to a sending pattern.

In one embodiment, the sending pattern is determined based on the reception rate of the first destination and/or on a reception rate of at least one of said additional destinations.

In one embodiment, the at least a first segment of data is stored in a memory of said transmitting unit, where data of said first segment is read from said memory by a direct memory access controller (or offloading device) and provided to a direct memory access device further supplying said data of said first segment to said network via a network interface wherein said direct memory access controller and said direct memory access device offloads a central processing unit of said transmitting unit.

In one embodiment, the direct memory access device comprises a checksum calculation unit calculating a checksum on the data provided to said direct memory access device from said direct memory access controller.

In one embodiment, a two-dimensional list structure controls said switching, said two-dimensional list structure comprising a first context descriptor relating to at least one data descriptor referring to header data in a memory, and a second context descriptor relating to at least one data descriptor referring to data of said first segment where said second context descriptor comprises a representation of how many bytes of data of said first segment to send before switching, wherein said method comprises processing said first context descriptor in order to obtain said header data, and processing said second context descriptor in order to obtain data of said first segment and transmitting a number of bytes of data according to said representation.

In one embodiment, a two-dimensional list structure controls transmission of said first segment, said two-dimensional list structure comprising a first context descriptor relating to at least one data descriptor referring to data of said first segment, a second context descriptor relating to at least two data descriptors, each data descriptor relating to header data for two different destinations, wherein said method comprises processing said first context descriptor in order to obtain at least a part of said first segment, processing said second context descriptor in order to obtain header data for one of said two different destinations and in order to obtain header data for the other one of said two different destinations and transmitting the obtained part of said first segment to the one of said two different destinations and transmitting the obtained part of said first segment to the other one of said two different destinations.

The present invention also relates to a device for transmitting a first segment of data via a data network from a transmitting unit to a first destination, the transmitting unit having a first data transmission rate, the first destination having a first data reception rate, where the first data transmission rate is larger than the first data reception rate, the device comprising: a direct memory access device adapted to effectively reducing the first transmission rate from the transmitting unit to the first destination by switching between transmitting at least a part of said first segment as one or more data packets to the first destination, the transmission being in a direction only from the transmitting unit to the first destination, and transmitting at least a part of at least a second segment as one or more data packets to one or more additional destinations, the transmission being in a direction only from transmitting unit to one or more additional destinations, said switching being repeated until said first segment and/or at least said second segment has been transmitted.

Embodiments of the device correspond to the embodiments of the method and have the same advantages for the same reasons. Advantageous embodiments of the device are defined in the sub-claims and described in detail in the following.

Furthermore, the invention also relates to a computer readable medium having stored thereon instructions for causing one or more processing units to execute the method according to the present invention.

BRIEF DESCRIPTION OF THE DRAWINGS

These and other aspects of the invention will be apparent from and elucidated with reference to the illustrative embodiments shown in the drawings, in which.

DESCRIPTION OF PREFERRED EMBODIMENTS

Figure 1:
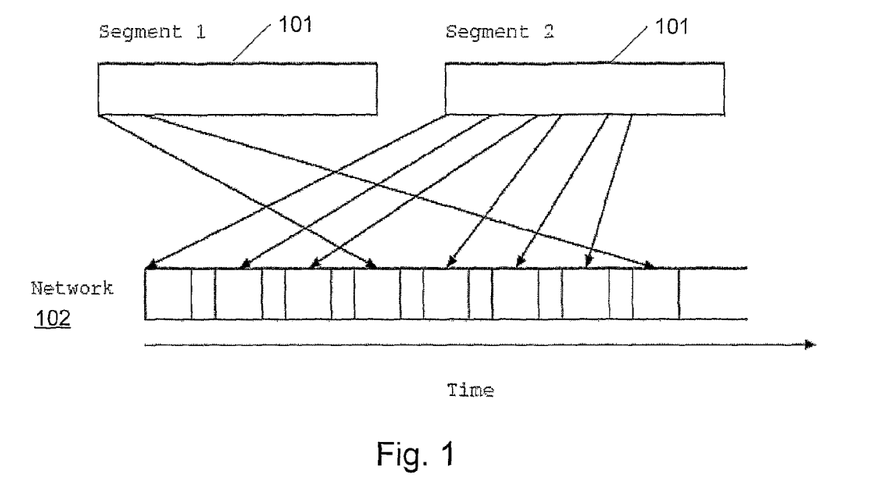
FIG. 1 schematically illustrates an example of a process of interleaving two segments during transmission.

FIG. 1 schematically illustrates an example of a process of interleaving two segments 101 during transmission. Shown are a first segment (Segment 1) 101 and a second segment (Segment 2) 101 and how packets of each segment are transmitted via a network 102 over time.

As an example, each segment comprises 10 kilobytes of payload data, where the payload data of the first segment will be sent to a first client (not shown), which is relatively slow, and where the data of the second segment will be sent to a second client (not shown), which is relatively fast. The MTU is in this example 1 kilobyte.

The packets can then be sent by interleaved transmission as (px=packet to client x): p2 p2 p2 p1 p2 p2 p2 p1 p2 p2 p2 p1 p2 p1 p1 p1 p1 p1 p1 p1. In this way, the packet rate to client 1 is reduced while the total packet rate for the transmitting system is maintained. The specific ordering of the transmitted data packets is done according to an appropriate sending pattern. The reduction of the packet transmission rate to client 1 will avoid or at least minimize the probability of router buffer exhaustion and/or drop of data packets since the packets are sent to client 1 at a pace where it can 'keep up'. Furthermore, when all packets to client 2 have been sent, it is possible to insert one or more wait states between the remaining packets to client 1 to keep the packet transmission rate down (thereby still avoiding causing buffer exhaustion and drop of data packets between the transmitting system and client 1 or at least providing a decreased probability of this happening). As an alternative instead of inserting one or more wait states, data transmission for one or more other segments could be started, e.g.—in the example above—when all packets to client have been sent, packets to client 3 (or a new segment to client 2) could be interleaved with the remaining packet to client 1.

Packets would according to one traditional method of doing network offloading in hardware (as the one described earlier) be sent as p1 p1 p1 p1 p1 p1 p1 p1 p1 p1 p2 p2 p2 p2 p2 p2 p2 p2 p2 p2 (assuming the first segment was to be sent first).

If the process is implemented in hardware the CPU usage is dramatically reduced compared to solutions without hardware offload.

An additional advantage is that client 2 (assuming that the first segment was to be sent first according to the traditional method) will obtain data earlier—and thereby earlier can start to process the data—than if client 2 should wait until all packets have been sent to client 1 before transmission of packets to client 2 would be initiated. This advantage may even be greater for a larger number of clients than 2. As one example with 3 clients, client 3 would traditionally have to wait until all the packets for both client 1 and 2 have been transmitted.

Figure 2A:
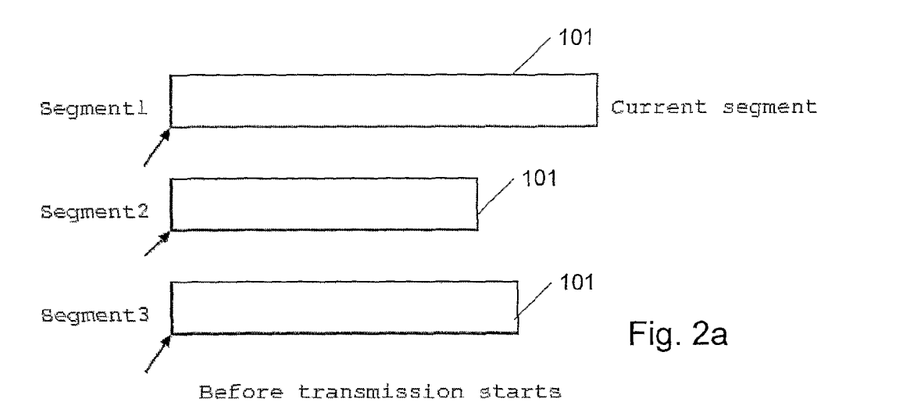
FIGS. 2a-2c schematically illustrate an example of an interleaving process according to the present invention.
Figure 2B:
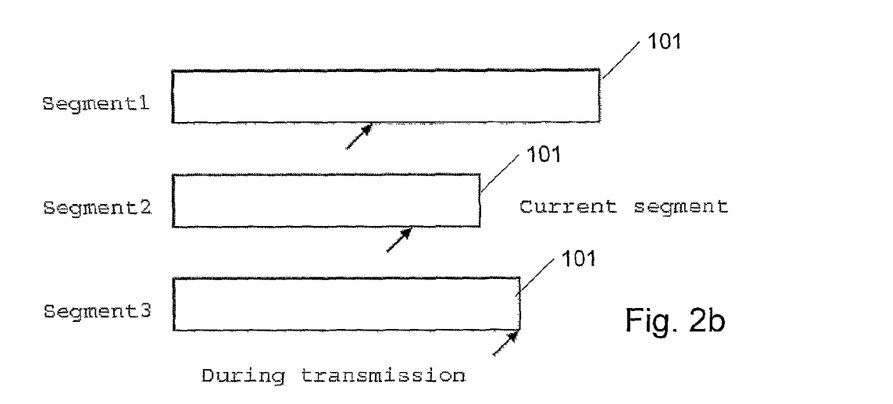
Figure 2C:
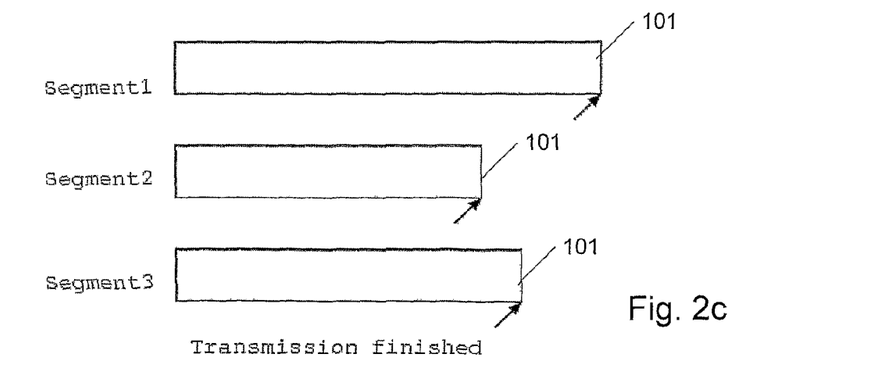

FIGS. 2a-2c schematically illustrates an example of an interleaving process according to the present invention. Shown are three segments 101 (Segment 1, Segment 2, and Segment 3) at three different points in time during interleaved transmission. The three segments 101 may be sent to three different client devices (not shown). The first point in time (FIG. 2a) is before transmission starts. The second point in time (FIG. 2b) is during transmission and the third point in time (FIG. 2c) is after transmission has been completed.

In FIGS. 2a-2c, an indication is given of the current segment, i.e. which segment currently has its data transmitted. Furthermore, a black arrow for each segment at each point in time indicates how much of the data of a given segment has been transmitted so far. The point indicating how much of the data of a given segment that has been transmitted is located at a complete packet boundary in order to avoid a decrease in network utilization.

A DMA (Direct Memory Access) controller and DMA device, DMA client, or network offloading unit (not shown; forth only denoted DMA device) will provide, as explained in greater detail in the following, access to several data areas (e.g. one for each segment) in a memory. The DMA device keeps track of the current location in each data area. A sending or switching pattern (forth only denoted sending pattern) is obtained or derived and information in this respect is given to the DMA controller instructing it when to switch data area—and thereby starting transmitting data for another segment (if any left). The specific sending pattern will offload the network with a reduced packet loss as the interleaving transmission effectively decreases the transmission rate to relatively slower client(s) as explained in more detail in the following. When switching, the DMA device automatically selects the next data area that has more data to be transmitted.

FIG. 2a illustrates the situation before anything has been done where each indication, designating how much data of each segment has been transmitted, is at the beginning each segment, i.e. no data has been sent yet. Segment 1 is, in this particular example, designated as the current segment.

FIG. 2b illustrates the situation where network offloading and transmission of data has been done for a certain amount of time. Here almost half of Segment 1 and the entire data of Segment 3 have been transmitted to their respective client devices or destinations (forth only denoted as clients) via the network. Currently, data is sent from Segment 2, which is designated as the current segment. After the DMA controller is instructed to switch by the DMA device, it will switch to transmitting data from Segment 1 (as Segment 3 is completed and there presently are no other segments) and will pick up from where it stopped during the last transmission of data from Segment 1.

The switch may—depending on the specific sending pattern—occur when all the data of Segment 2 has been transmitted or before. If before, the current location of Segment 2 will be stored so that transmission may be resumed from that point when returning to Segment 2.

FIG. 2c illustrates the situation where all the data of the three segments have been transmitted. The DMA controller will then signal to the DMA device that the work has been done and await further instructions.

As mentioned, the jumping or switching between sending data from the three segments is done according to a specific sending pattern. The specific sending pattern will be influenced by the capabilities of the various clients receiving the data. One parameter to take into consideration is e.g. the network speed of the different clients. This can readily be determined, e.g. by sending a test data packet to the client and await acknowledgement. Alternatively, it could be determined in another way.

As a specific example, let the network (receiving) speeds of client 1 and 2 be about 2 megabit/second and the (receiving) speed of client 3 be about 4 megabit/second then (on average or in general) data from Segment 3 (to client 3) should be transmitted (i.e. Segment 3 will be the current segment) about 2 times as often and the sending pattern could e.g. be: Transmit X data from Segment 1, transmit X data from Segment 3, transmit X data from Segment 2, transmit X from Segment 3, transmit X data from Segment 1, etc.

As another example, take two segments to two different clients, where one client is three times as fast as the other then the sending pattern could e.g. be: Transmit X data from Segment 1, transmit **3*X data from Segment 2** and then repeat until all data has been transmitted.

As mentioned previously, wait states can also be inserted for one or more segments when another segment has been completely transmitted in order to keep the transmission rate down and thereby still avoiding buffer exhaustion and drop of data packets. Alternatively, data transmission for one or more additional segments (e.g. to the same or new clients) could be started.

Figure 3:
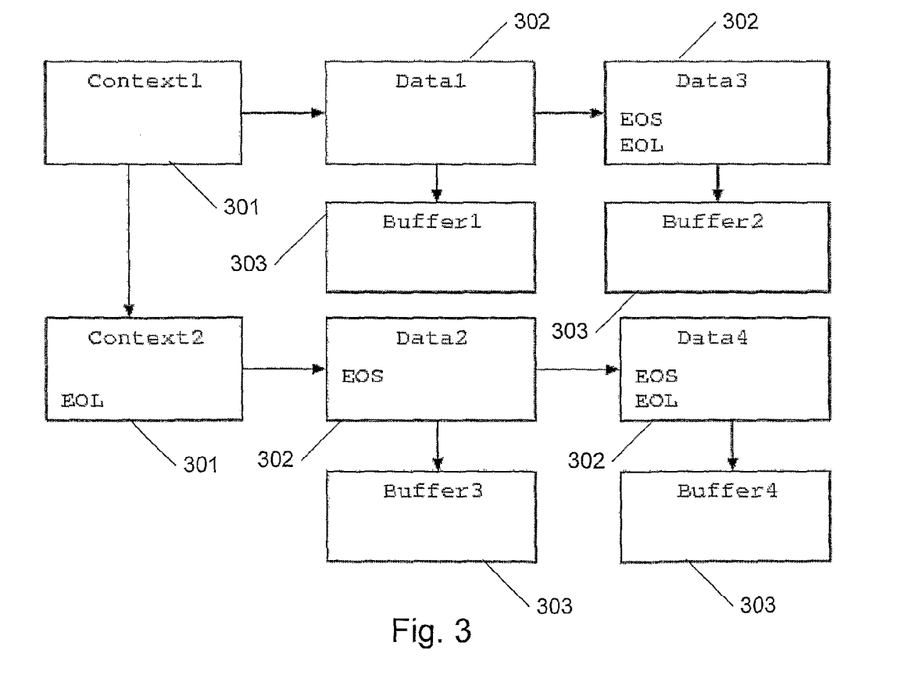
FIG. 3 schematically illustrates an overview of a structure for keeping track of the various interleaved transmissions according to one embodiment.

FIG. 3 schematically illustrates an overview of a structure for keeping track of the various interleaved transmissions according to one embodiment.

Shown is a two-dimensional list-structure comprising descriptors 301, 302 controlling the access to data stored in a memory that is to be sent as data packets to one or more clients. Each descriptor may comprise metadata instructing the DMA device what type of data it is (e.g. header data or payload data) and how to treat it. The descriptors may also comprise one or more control flags to signal various conditions such as end of segment (EOS) and end of list (EOL). Such list-structures are generally also known as Scatter-Gather Lists (SGLs) and allow data to be fetched from discontinuous memory.

One type of descriptor is e.g. a data descriptor 302 that is used to keep track of an actual data buffer 303, i.e. a memory or storage unit and what segment the stored data therein belongs to. Another type of descriptor is e.g. a context descriptor 301 that is used—according to this embodiment— to keep track of a state of a list comprising data descriptors 302.

The DMA controller is, under the control of the DMA, able to switch between several contexts. Each context may relate to a single client and e.g. to several segments for that single client as can be seen from FIG. 3 and the description below. Furthermore, several contexts may be related to the same segment—see later for a context related to header data of a given segment and another context related to the payload of the same segment.

At each switch, the DMA device can be instructed to save the state of the list (or not). When EOL is reached in a list, the given context is disabled (or alternatively removed) and the DMA device will not switch to that context again. The DMA device may preferably also remember one (or more) context descriptor (typically only one will be sufficient thereby reducing the storage requirements).

In the particular example shown in FIG. 3, Context1 and Context2 are context descriptors 301 while Data1, Data2, Data3, and Data4 are data descriptors 302.

This exemplary list-structure therefore comprises 2 contexts, as given by context descriptors Context1 and Context2.

Context1 identifies one segment of data as indicated by data descriptors Data1 and Data3, which point to Buffer1 and Buffer2 303, respectively. If the segment could be stored in a single buffer, only one data descriptor would be present in the Context1 list. Data descriptor Data3 furthermore comprises two set flags, namely EOS and EOL, signifying that no more segments are part of Context1 (EOS) and that Data3 is the last list element of Context1 (EOL).

That Context1 only relates to a single segment of data can be seen from that the list Context1 refers to or comprises only a single EOS before EOL is reached.

In a similar way, Context2 identifies two segments of data as indicated by data descriptors 302 Data2 and Data4, which point to Buffer3 and Buffer4 303, respectively. If the two segments could be stored in a single buffer Data2 and Data4 would point to the same buffer (but at two different locations). Data2 comprises a set EOS flag and Data4 comprises a set EOS and a set EOL flag.

The Context2 descriptor also comprises a set EOL flag signifying that no more contexts currently are being processed by the DMA device, i.e. there are no additional data to be transmitted presently.

That Context2 relates to two segments of data can be seen from that the list Context2 comprises two EOSs before EOL is reached.

In the simplest case, there is only one segment being transmitted to one destination, which can receive packets at full speed (i.e. no waiting states are necessary) and the list-structure 'collapses' to a one-dimensional list with two data descriptors; one pointing to header data and the other one pointing to payload data of the segment. In this situation, no interleaved transmission and thereby no context descriptors are necessary.

Figure 4:
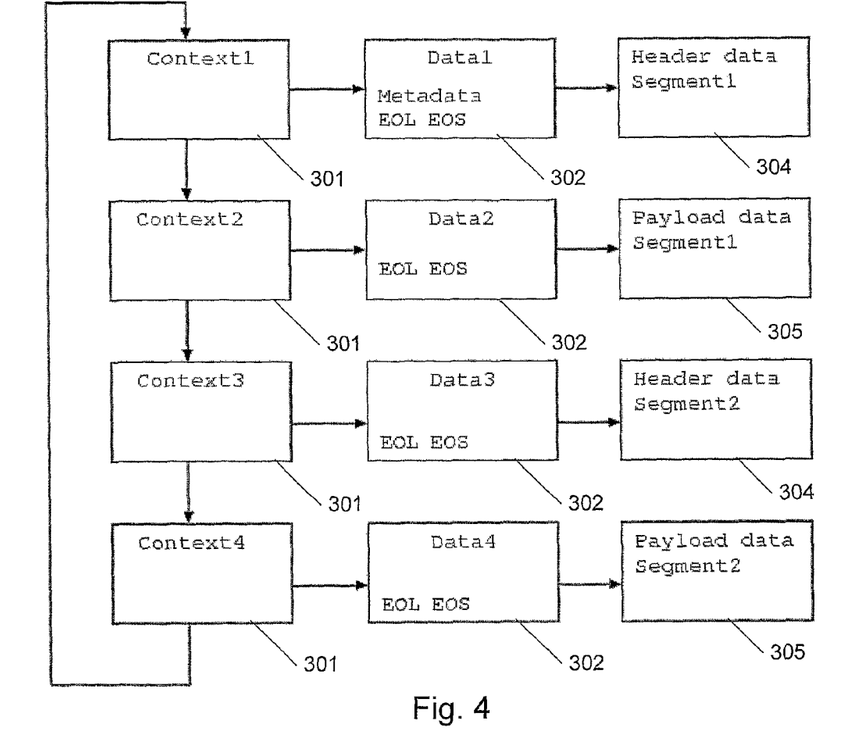
FIG. 4 schematically illustrates one particular example of a structure for keeping track of interleaved transmission.

FIG. 4 schematically illustrates one particular example of a structure for keeping track of interleaved transmission.

Here a particular list-structure has been setup and comprises as an example four contexts 301 Context1, Context2, Context3, and Context4

Context descriptor 301 Context1 refers to the data descriptor 302 Data1 and to context descriptor 301 Context2. The data descriptor 302 Data1 comprises an EOL and an EOS flag as metadata and refers to header data 304 for a given segment Segment1 where the data is stored in a buffer or other suitable memory.

Context descriptor 301 Context2 refers to the data descriptor 302 Data2 and to context descriptor 301 Context3. The data descriptor 302 Data2 comprises an EOL and an EOS flag as metadata and refers to payload data 305 for the segment Segment1 where the data is stored in a buffer or other suitable memory.

Context descriptor 301 Context3 refers to the data descriptor 302 Data3 and to context descriptor 301 Context4. The data descriptor Data3 comprises an EOL and an EOS flag as metadata and refers to header data 304 for a segment Segment2 where the data is stored in a buffer or other suitable memory.

Context descriptor 301 Context4 refers to the data descriptor 302 Data4 and back again to context descriptor 301 Context1. The data descriptor 302 Data4 comprises an EOL and an EOS flag as metadata and refers to payload data 305 for the segment Segment2 where the data is stored in a buffer or other suitable memory.

The list structure for interleaved transmission is then processed during transmission according to the present invention and instructs the DMA device how to act, from where to read data (via the DMA controller), what type of data it is, when to switch segment (if necessary), etc.

For the shown exemplary structure the resulting process could then e.g. be summarized as:

1. Process Context1 which then causes the DMA controller to start delivering header data belonging to Segment1 to the DMA device, which then can supply it to respective client or destination via a network.
2. After the header data has been transmitted the DMA controller is instructed by the DMA device to switch to Context2. At this stage it is not known whether Context1, i.e. the header data, will be needed again as this depends on whether all the payload data of Segment1 is transmitted or not before switching to transmitting data for Segment2 (i.e. switching to Context3 and 4). Therefore the DMA controller is instructed to switch to Context2 without the DMA device storing the position for the current Context. The DMA device is instructed to remember this context, i.e. Context1.

3. After switching to Context2, the DMA controller delivers payload data (one or more MTUs) of Segment1 to the DMA device, which then can supply it to respective client or destination via a network.

4. After sending a certain amount of data e.g. depending on the specific sending pattern, the DMA device is instructed to switch to Context3. The switching time can e.g. be determined to be after a specific number of MTUs have been transmitted. Such a number may be specified in the context descriptor metadata. The number may be the same for all or some of the various contexts or it can be different as specified by the preferred sending pattern. For each transmitted packet, an internal counter may be incremented. When the value of the internal counter matches the value stored in the context descriptor, the DMA device will be instructed to switch context and clear the internal counter. If switching occurs before the entire payload data of Segment1 has been transmitted, the DMA device stores the current position so that transmission can be resumed from that point when returning to Context2 once again. The DMA device can e.g. store the position in variables, fields, or the like in the context descriptor, i.e. Context2. As an example, one field may be used to store the last data descriptor used and another field may store how far into that data descriptor, data has been processed. If end of segment is reached then all the payload data has been transmitted and Context1 and Context2 will therefore not be needed anymore. In Context2 the EOS flag is set. To disable Context1, the DMA device is instructed to restore the context that was remembered (see step 2 above) previously and that context is also disabled (as header data for Segment1 will also not be needed as the payload data for Segment1 has been transmitted). Context1 can also be disabled by setting the EOS flag. After disabling Context1 and Context2 the DMA device switches to the next context, which in this example is Context3.

5. In Context3, the DMA controller delivers header data belonging to Segment2 (corresponding to step 1 above for Segment1) to the DMA device, which then can supply it to respective client or destination via a network.

6. After the header data has been transmitted, the DMA device switches to Context4 where the payload data of Segment2 is transmitted. Before switching to Context4, the position of Context3 is not stored but Context3 is remembered (as in step 2 above).

7. After switching to Context4, the DMA controller delivers payload data (one or more MTUs) of Segment2 to the DMA device, which then can supply it to respective client or destination via a network.

8. At a certain time depending on the sending pattern, the DMA device switches to the next context—in this example Context1—where the current position of transmitted data in Context4 is stored if switching occurs before all the payload data of Segment2 has been transmitted. Otherwise Context3 is re-called and disabled and Context4 is also disabled (as in step 4 above).

9. In Context1, the DMA device receives and transmits header data for Segment1 and since no position was saved, the entire header is transmitted again. After the header data has been transmitted the process switches to Context2 and the position of Context1 is not saved.

10. In Context2, transmission is resumed from the saved position (that was saved at step 4) and one or more MTUs of additional payload data of Segment1 is transmitted.

The process continues until all the payload data of Segment1 and Segment2 have been transmitted. As mentioned, if payload data of one segment is transmitted before the other one is completed one or more wait states can be inserted.

In one embodiment, the data descriptors 302 have a structure comprising a variable representing the start and the end of a data buffer (i.e. the memory location of the given segment the relevant data (header or payload) is stored at). Furthermore, the structure of the data descriptors may comprise control flags to indicate EOS and EOL and a pointer to the next descriptor and a meta data field or the like to instruct the DMA device what to do.

In one embodiment, the structure of the context descriptors may comprise a variable to keep track of a position in a data descriptor list. When context is switched, the DMA device (not shown; see e.g. FIGS. 7 and 8) will be instructed to update the position in the context descriptor. The next time the same context is used, the DMA device will instruct the DMA controller to start at the stored position.

Figure 5:
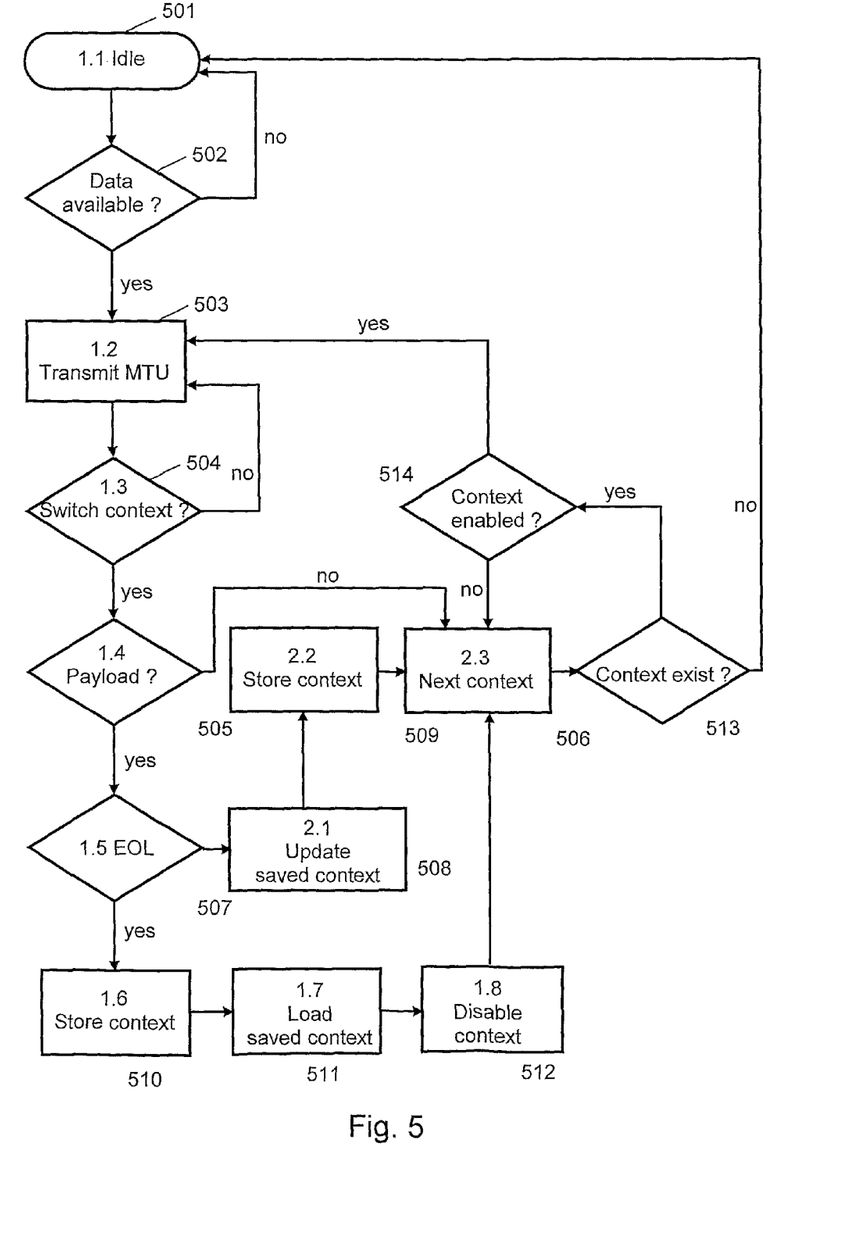
FIG. 5 schematically illustrates a flow chart of one embodiment of the interleaving process according to the present invention.

This procedure is shown and explained in general in connection with FIG. 5.

FIG. 5 schematically illustrates a flow chart of one embodiment of the interleaving process according to the present invention. The device or method is in an idle state at step 501. A test 502 is made (by interrupt, request, timer, etc.) whether data is available for transmission. If not the idle state is resumed.

If data is available for transfer, a data packet comprising a payload of one MTU is transmitted to a first client at step 502. Then it is checked at step 504 whether a switch in context should be made or not—i.e. should there be switched to another segment for another client. Whether a switch should be made, may be triggered by reaching an end-of-list (EOL) in the respective context or that the specified amount of data (according to the sending pattern) has been transmitted. As explained earlier, such an amount of data may e.g. be specified in the context descriptor metadata. The number may be the same for all or some of the various contexts or it can vary as specified by the preferred sending pattern.

If no switch should be made, the operation returns to step 503 and continue transmitting another MTU of data.

If a switch should be made, it is checked at step 505 whether the current context was a context with payload data or header data. If it is a context with header data there is no information about whether this header data will be needed again as this depends on whether all the related payload data will be sent at the next step (in which case the header data is not needed again later) or whether one or more additional switches of segment will be done before all the payload data has been transmitted (in which case the header data will be needed) so the operation proceeds to step 506 switching to the next context as will be explained later.

If the current context comprises payload data, another test is made at step 507 that checks whether end-of-list (EOL) for the current context has been reached. If not at an end-of-list of the context, the current context is stored at step 508 for later use and the current position—i.e. until where in the given segment has data been transmitted—is saved at step 509. After step 509 operation proceeds to step 506 switching to the next context as will be explained later.

If end-of-list is reached then the all the segments—which may be only one—for one context has been transmitted and the header and payload data is no longer necessary. In this case, the DMA device is instructed to store the current context at step 510 and the context is also disabled since end-of-list has been reached.

Then the DMA device is instructed at step 511 to restore a context that has been saved during step 508 at an earlier time and to disable that context at step 512, which will disable the header context. Thus both the header and the payload contexts are disabled.

After step 512 operation proceeds to step 506 switching to the next context.

After step 506, a test 513 is then made whether a next context exist. If not—i.e. all contexts have been duly processed and thereby all segments have been transmitted—the idle state at step 501 is resumed.

If a context exists, it is checked 514 whether that context is still enabled. If not, step 506 is done again thereby selecting a new context. If the new context is enabled—i.e. not processed completely—step 503 is resumed to transmit further data.

Step 506 and the two following tests 513 and 514, will cause the DMA device to automatically load contexts until one enabled one is found or it is determined that all contexts are disabled, e.g. by checking whether a disabled context is returned to without encountering any enabled ones. When all contexts are disabled transmission has been completed.

Figure 6:
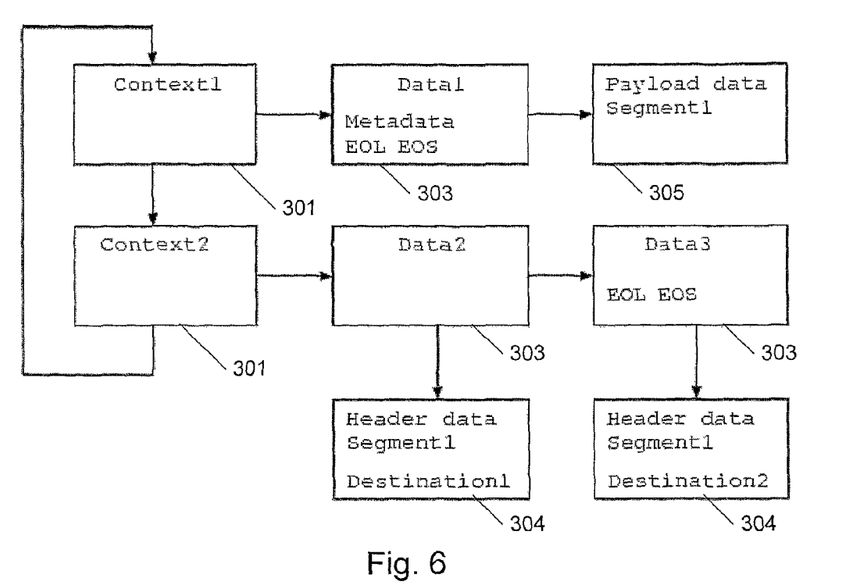
FIG. 6 schematically illustrates an embodiment of an advantageous list-structure example for sending the same segment to several clients while reading the data only once from memory.

FIG. 6 schematically illustrates an embodiment of an advantageous list-structure example for sending the same segment to several clients while reading the data only once from memory. Shown is a two-dimensional list-structure comprising two context descriptors 301 Context1 and Context2 where Context1 refers to Context2 and Context2 refers back to Context1.

Context1 comprises a data descriptor 303 Data1 that points to a buffer comprising the payload data 305 of a given segment Segment1.

Context2 comprises two data descriptors 303 Data2 and Data3 where Data2 points to a buffer or other suitable memory location comprising header data 304 for Segment1 of a first client or destination Destination) and where Data3 points to a buffer or other suitable memory location comprising header data 304 for Segment1 of a second client or destination Destination2.

During operation the following sequence may take place:
1. Context1 is accessed and the DMA controller obtains or reads one or more MTUs (e.g. as defined in the context descriptor metadata of Context1) of payload data for Segment1 from the buffer or memory.
2. The DMA device stores the current location and switches to Context2.
3. Processing Context2, the DMA controller obtains header data for the first destination using data descriptor Data2. The payload data for Segment1 obtained at step 1 is then transmitted by a DMA device (not shown; see e.g. 704 in FIGS. 7 and 8) to the client as defined by Destination1.
4. As Data2 does not have its EOL flag set, data descriptor Data3 is then processed which provides header data for the second destination Destination2 and the already obtained and transmitted payload data for Segment1 (as provided at step 1) is then transmitted by the DMA device to the client as defined by Destination2. As the EOL and EOS flags of Data3 are set, switching to the next context is done. No saving of position is done as the header information will be needed again in their entirety. The next context is in this example Context1 and the steps are repeated until all the payload data of Segment1 has been transmitted to both destinations.

It is to be understood that the process may involve sending data to more than two destinations. This would only require one data descriptor pointing to relevant header information for each destination.

Figure 7:
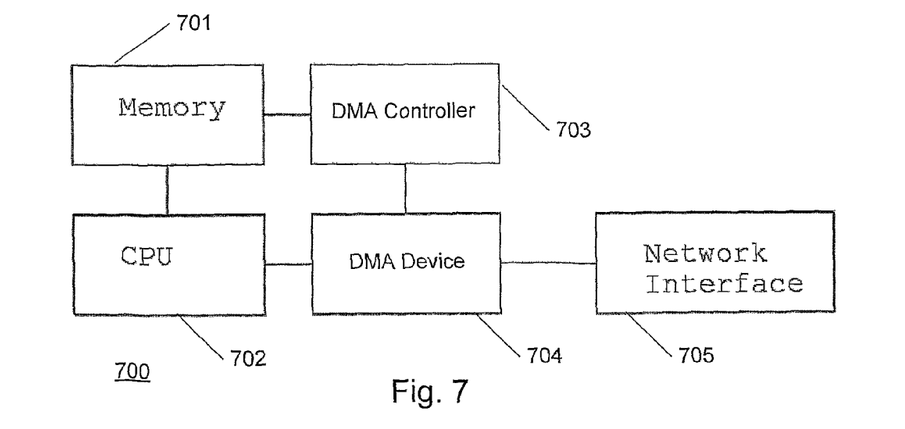
FIG. 7 illustrates a schematic block diagram of a transmitting unit or system with hardware network offloading.

FIG. 7 illustrates a schematic block diagram of a transmitting unit or system with hardware network offloading 700. The transmitting unit or system is connected to a network where also at least one client is connected to (e.g. ad-hoc). The network may e.g. be local, remote, wired, wireless, etc.

Shown are a memory and/or one or more buffers 701 (forth only denoted memory) comprising the segment(s) to be transmitted where the memory is connected to a main central processing unit (CPU) 702 responsible for operating the transmitting unit or system. The memory is also connected to a DMA controller 703 providing access to one or more data areas (e.g. one for each segment) in the memory, each data area comprising a stored segment, in an interleaved fashion as explained previously.

The DMA controller is connected to a DMA device, DMA client or network offloader 704 that is responsible for controlling the DMA controller according to the present invention. The DMA device is connected to the CPU, which controls it, and to a network interface 705 enabling transmission of data on a given network. When transmitting data, the transmitting unit or system sets up the DMA device to transmit the data and the DMA device takes care of the segmentation, switching etc. to offload the main CPU and transmits data to the network interface, which sends it on the network to be received by one or more client's network interface(s).

The main CPU has an interface to configure the DMA device and the DMA device then reads the data for transmission as described using the DMA controller.

The DMA controller under the control of the DMA device keeps track of the current location in each data area. A sending pattern is obtained or derived and information in this respect is provided to the DMA controller, instructing it when to switch data area—and thereby starting transmitting data for another segment (if any left). The specific sending pattern will offload the network with a reduced packet loss as the interleaving transmission effectively decreases the transmission rate to relatively slower client(s) as explained in more detail in the following. When switching, the DMA controller automatically selects the next data area, as instructed by the DMA device, that has more data to be transmitted, as explained previously.

The DMA device and DMA controller may be implemented in hardware thereby dramatically reducing the CPU usage for networking offloading than compared to software based solutions.

Figure 8:
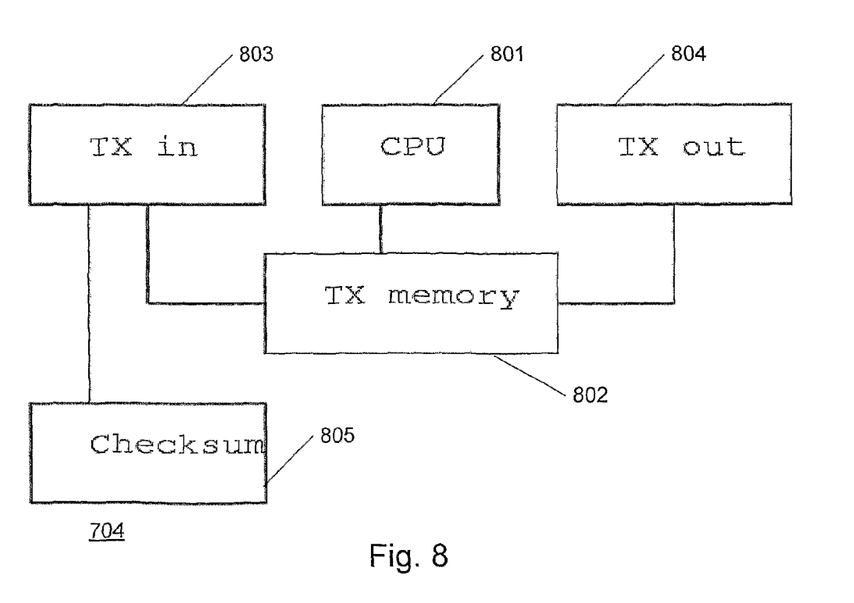
FIG. 8 illustrates a schematic block diagram of one embodiment of a DMA controller.

FIG. 8 illustrates a schematic block diagram of one embodiment of a DMA device.

Shown are a CPU 801 connected to a transmission (TX) memory 802 that is connected to a transmission in (TX in) unit 803 and a transmission out (TX out) unit 804. A checksum calculation unit 805 is connected to the TX in unit 803. Data is read into the TX memory 802 by the TX in unit 803 from the DMA controller (not shown; see e.g. 703 in FIG. 7) (and simultaneously the checksum unit calculates the checksum of the read data packet) and then processed by the CPU 801 and sent out to a network interface (not shown; see e.g. 705 in FIG. 7) by the TX out unit 804.

Figure 9:
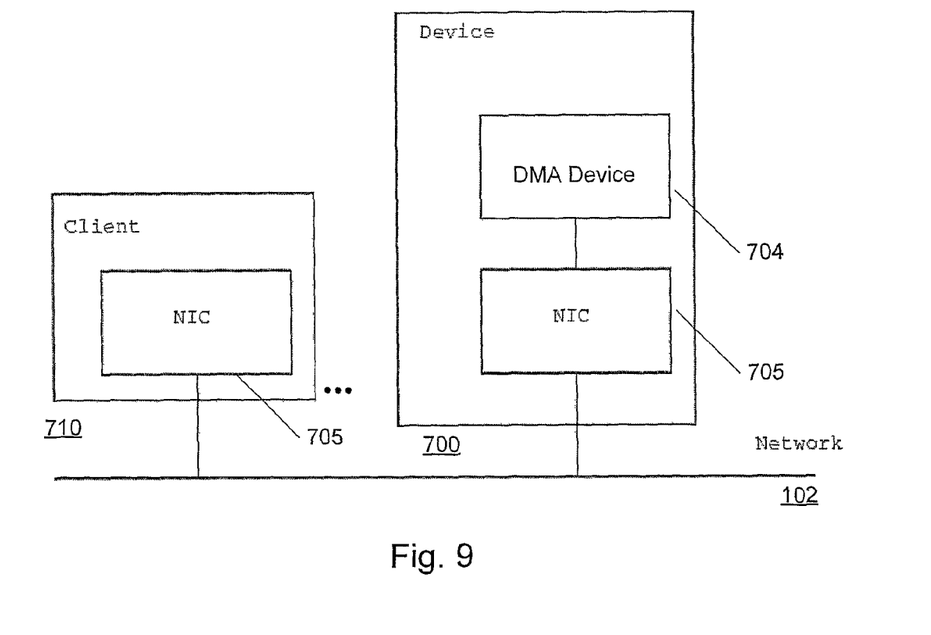
FIG. 9 illustrates a schematic block diagram of a system comprising a transmitting unit or system with hardware network offloading and one or more clients connected in a network.

FIG. 9 illustrates a schematic block diagram of a system comprising a transmitting unit or system with hardware network offloading and one or more clients connected in a network. Shown are a transmitting unit or system with hardware network offloading 700, comprising a DMA device 704 and a network interface 705 enabling transmission of data on a given network, and one or more clients 710 also comprising a network interface 705. The client(s) 710 and the transmitting unit or system are connected via a network 102.

Figure 10:
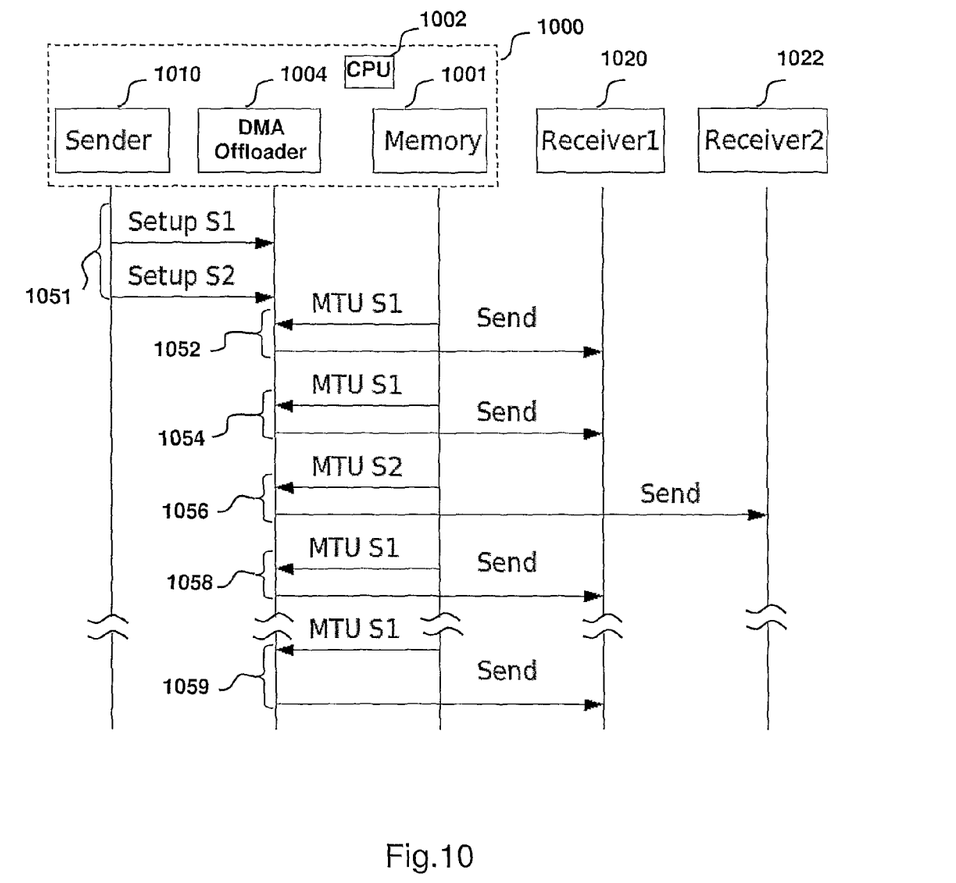
FIG. 10 is a signalling diagram of a transmission from a transmitting unit to receivers.

FIG. 10 is a signalling diagram of a transmission from a transmitting unit 1000 utilizing hardware network offloading similar to the transmission described in connection with FIG. 7. The transmitting unit 1000 is connected to a network to which also a number of receivers 1020, 1022 are connected. The network to which these communicating entities are connected may, e.g., be local, remote, wired, wireless, etc.

The transmitting unit 1000 comprises a memory 1001 that stores the segment(s) to be transmitted, and a DMA offloading controller 1004. Schematically shown in FIG. 10, the memory 1001 and the DMA offloader 1004 are connected to a processing unit 1002, similar to the situation in FIG. 7. The memory 1001 is connected to the DMA Offloading controller 1004 providing access to one or more data areas (e.g. one for each segment) in the memory 1001, each data area comprising a stored segment, in an interleaved fashion as explained above.

The DMA Offloader enables transmission of data on the network, and when transmitting data, the transmitting unit 1000, by means of sender software 1010 executing in the processing unit 1002, sets up the DMA Offloader 1004 to transmit the data and the segmentation, switching etc. to offload the processing unit 1002 and transmits data on to the network to be received by one or more receiver's 1020, 1022 network interface(s).

The following sequence of signalling steps take place in the transmitting unit 1000:

In a first signalling step 1051, the sender software 1010 tells the DMA offloader 1004 about segments S1 and S2. No real data is transferred, but only metadata about the segments. An example of a sending pattern, as shown in FIG. 10, is one beginning with p1 p1 p2 p1 and ending with p1.

In a second signalling step 1052, the DMA offloader 1004 reads one MTU from segment 1, and sends the data to the first receiver 1020. In a third signalling step 1054 the DMA Offloader 1004 reads the second MTU of segment 1 from memory, and sends the data to the first receiver 1020. In a fourth signalling step 1056 the DMA Offloader switches to segment 2 and reads the first MTU. The first packet is sent to the second receiver 1022, and while sending the data, the DMA Offloader 1004 goes back to the first segment and reads and sends the third MTU in a fifth signalling step 1058. This continues, as illustrated by a sixth signalling step 1059, until all packets has been sent, and there is no need for feedback from the receivers in the form of ACKs or similar. In the signalling steps 1052, 1054, 1056, 1058, 1059, it is to be noted that the reading of the MTU's may be performed simultaneous with the sending of the data to the receivers.

The specific sending pattern will offload the network with a reduced packet loss as the interleaving transmission effectively decreases the transmission rate to relatively slower client(s), without using acknowledgement (ACK) signals.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of transmitting a first segment of data and a second segment of data, the method comprising:
    (A) transmitting at least a part of said first segment of data in one or more data packets from a transmitting unit to a first destination, a transmission rate of said transmitting unit being greater than a reception rate of said first destination;
    (B) transmitting at least a part of said second segment of data as one or more different data packets from the transmitting unit to one or more additional destinations, said first segment of data and said second segment of data including different data; and
    switching between steps A and B until said first segment and/or at least said second segment has been transmitted, which results in effectively reducing said transmission rate from said transmitting unit to said first destination.

2. The method according to claim 1, further comprising: inserting one or more wait states between the one or more data packets of said at least a part of said first segment of data being transmitted to the first destination.

3. The method according to claim 1, the method further comprising:
    before switching between steps A and B, saving a first position in said first segment of data defining how much of said first segment of data has been transmitted and/or saving a position of said second segment of data defining how much of said second segment of data has been transmitted and when transmission of said first segment of data or said second segment of data is switched back to again, resuming transmission from the respective saved position.

4. The method according to claim 1, wherein said switching between steps A and B is done according to a sending pattern.

5. The method according to claim 4, wherein said sending pattern is determined based on the reception rate of the first destination and/or on a reception rate of at least one of said one or more additional destinations.

6. The method according to claim 1, wherein said at least a part of said first segment of data is stored in a memory of said transmitting unit, wherein data of said first segment of data is read from said memory by a direct memory access controller and provided to a direct memory access device further supplying said data of said first segment of data to said first destination over a network via a network interface, wherein said direct memory access controller and said direct memory access device offloads a central processing unit of said transmitting unit.

7. The method according to claim 6, wherein said direct memory access device comprises a checksum calculation unit calculating a checksum on the data provided to said direct memory access device from said direct memory access controller.

8. The method according to claim 1, wherein a two-dimensional list structure controls said switching between steps A and B, said two-dimensional list structure comprising:
    a first context descriptor relating to at least one data descriptor referring to header data in a memory, and
    a second context descriptor relating to at least one data descriptor referring to data of said first segment of data, wherein said second context descriptor comprises a representation of how many bytes of data of said first segment of data to send before switching between steps A and B;

wherein said method further comprises:
processing said first context descriptor to obtain said header data; and
processing said second context descriptor to obtain data of said first segment of data and transmitting a number of bytes of data according to said representation.

9. The method according to claim 1, wherein a two-dimensional list structure controls transmission of said first segment of data, said two-dimensional list structure comprising:
a first context descriptor relating to at least one data descriptor referring to data of said first segment of data,
a second context descriptor relating to at least two data descriptors, each data descriptor relating to header data for two different destinations;
wherein said method further comprises:
processing said first context descriptor to obtain at least a part of said first segment of data;
processing said second context descriptor to obtain header data for one of said two different destinations and to obtain header data for the other one of said two different destinations and transmitting the obtained part of said first segment of data to the one of said two different destinations and transmitting the obtained part of said first segment of data to the other one of said two different destinations.

10. A device comprising:
circuitry configured to:
(A) transmit at least a part of a first segment of data in one or more data packets via a data network to a first destination, a transmission rate of said device being greater than a reception rate of said first destination;
(B) transmit at least a part of at least a second segment of data as one or more different data packets to one or more additional destinations, said first segment of data and said second segment of data including different data, wherein
said circuitry controls switching between A and B until said first segment and/or at least said second segment has been transmitted, which results in effectively reducing said transmission rate from said device to said first destination.

11. The device according to claim 10, wherein said circuitry is further configured to insert one or more wait states between the data packets of said at least first segment of data being transmitted to the first destination.

12. The device according to claim 10, wherein the circuitry is further configured to, before switching between A and B is to be done, save a first position in said first segment of data defining how much of said first segment of data has been transmitted and/or save a position of said second segment of data defining how much of said second segment of data has been transmitted, and when transmission of said first segment of data or said second segment of data is switched back to again, control resuming transmission from the respective saved position.

13. The device according to claim 10, wherein said switching between A and B is done according to a sending pattern.

14. The device according to claim 13, wherein said sending pattern is determined based on the reception rate of the first destination and/or on a reception rate of at least one of said additional destinations.

15. The device according to claim 10, further comprising:
a memory having stored therein said at least a first segment of data, wherein
the circuitry includes a network interface, a direct memory access controller and a direct memory access device,
the direct memory access controller is configured to read data of said first segment of data from said memory and provide said read data to said direct memory access device, said direct memory access device supplies said data of said first segment of data to said network via said network interface, and said direct memory access controller and said direct memory access device effectively offload a central processing unit of said device.

16. The device according to claim 15, wherein said direct memory access device comprises a checksum calculation unit configured to calculate a checksum on the data provided to said direct memory access device from said direct memory access controller.

17. The device according to claim 10, wherein said device comprises a two-dimensional list structure for controlling said switching between A and B, said two-dimensional list structure comprising:
a first context descriptor relating to at least one data descriptor referring to header data in a memory, and
a second context descriptor relating to at least one data descriptor referring to data of said first segment of data where said second context descriptor comprises a representation of how many bytes of data of said first segment of data to send before switching,
wherein said circuitry is further configured to:
process said first context descriptor to obtain said header data; and
process said second context descriptor to obtain data of said first segment of data and to transmit a number of bytes of data according to said representation.

18. The device according to claim 10, wherein said device comprises a two-dimensional list structure for controlling transmission of said first segment of data, said two-dimensional list structure comprising:
a first context descriptor relating to at least one data descriptor referring to data of said first segment of data,
a second context descriptor relating to at least two data descriptors, each data descriptor relating to header data for two different destinations,
wherein said circuitry is further configured to:
process said first context descriptor to obtain at least a part of said first segment of data; and process said second context descriptor to obtain header data for one of said two different destinations and to obtain header data for the other one of said two different destinations and transmit the obtained part of said first segment of data to the one of said two different destinations and transmit the obtained part of said first segment of data to the other one of said two different destinations.

19. A non-transitory computer readable medium comprising computer executable instructions for causing a device to execute:
(A) transmitting at least a part of a first segment of data in one or more data packets to a first destination, a transmission rate of said device being greater than a reception rate of said first destination; and
(B) transmitting at least a part of at least a second segment of data as one or more different data packets to one or more additional destinations, said first segment of data and said second segment of data including different data; and switching between A and B until said first segment and/or at least said second segment has been transmitted, which results in effectively reducing said transmission rate from said device to said first destination.

* * * * *